(No Model.)

L. S. HOYT.
STOPPLE FOR BOTTLES.

No. 311,834. Patented Feb. 3, 1885.

Witnesses

Inventor
Lewis S Hoyt

United States Patent Office.

LEWIS STEBBINS HOYT, OF BOSTON, MASSACHUSETTS.

STOPPLE FOR BOTTLES.

SPECIFICATION forming part of Letters Patent No. 311,834, dated February 3, 1885.

Application filed August 9, 1884. (No model.)

*To all whom it may concern:*

Be it known that I, LEWIS STEBBINS HOYT, a citizen of the United States, residing at Boston, in the county of Suffolk and State of Massachusetts, have invented an Improved Method or Process of Manufacturing Stopples for Bottles, of which the following is a specification.

Figure 1:
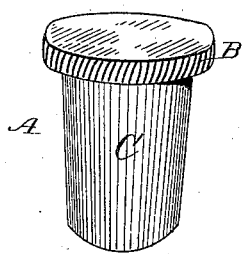
Figure 2:
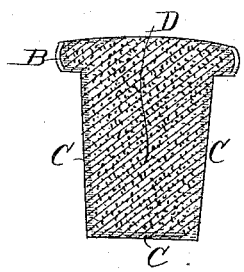

Figure 1 represents a perspective view of a stopple manufactured by my process, and Fig. 2 represents a vertical section of the same.

To make such a stopple I first pass flat thin webs of caoutchouc of convenient width through heated rolls. When sufficient heat has thereby been communicated to said caoutchouc, granulated cork is distributed evenly over the surface thereof. The cork will adhere to the sticky surface of the tepid caoutchouc. By continued rotation of the rolls the surfaces of succeeding layers of caoutchouc are brought into contact with each other and caused to adhere. The laminated composite material thus produced is transferred, when it has reached a sufficient thickness, to a metal matrix, where it is subjected to great pressure by plates or covers forcing it into the matrix. Heat is then applied to the matrix, and the process of vulcanizing is continued until a desirable proportion of the gum is brought to the surface to produce a uniform coating free from any particles of cork. Of course many other articles may be made in this way as readily as bottle-stoppers.

Having thus described my invention, what I claim as new, and desire to secure by Letters Patent, is—

The process of manufacturing stopples for bottles, consisting in the following steps: first, heating and pressing thin webs of caoutchouc between rolls; second, sprinkling granulated cork over said webs; third, rolling together these layers of caoutchouc with the cork particles adhering to their faces; fourth, heating and simultaneously pressing the laminated composite material thus produced to make it take the form and consistency of a stopple, substantially as set forth.

LEWIS S. HOYT.

Witnesses:
WM. H. MILLER,
JAS. W. CURRIE.